United States Patent [19]
Yokohama et al.

[11] Patent Number: 5,257,160
[45] Date of Patent: Oct. 26, 1993

[54] SERIAL SIGNAL TRANSMISSION DEVICE AND CONTROL METHOD FOR DETERMINING POLARITY

[75] Inventors: Koji Yokohama; Fumio Aoi; Kanji Isomichi, all of Nagoya; Atsushi Hirose, Nishikasugai; Hitoshi Yasuda, Nishikasugai; Chuzo Ninagawa, Nishikasugai, all of Japan

[73] Assignee: Mitsubishi Jukogyo Kabushiki Kaisha, Tokyo, Japan

[21] Appl. No.: 651,260

[22] PCT Filed: Apr. 12, 1990

[86] PCT No.: PCT/JP90/00490

§ 371 Date: Apr. 11, 1991

§ 102(e) Date: Apr. 11, 1991

[87] PCT Pub. No.: WO91/07034

PCT Pub. Date: May 16, 1991

[30] Foreign Application Priority Data

Oct. 25, 1989 [JP]  Japan .................. 1-276048

[51] Int. Cl.⁵ .................. H04B 3/02; H04L 25/00
[52] U.S. Cl. .................. 361/246; 178/3; 375/36
[58] Field of Search .......... 361/245, 246; 246/228, 246/232, 242 R, 242 A, 242 B; 340/825.42; 370/85.9, 85.11, 85.1, 78; 178/2 A, 2 D, 16, 2 R, 3; 379/93; 375/7, 17, 36

[56] References Cited

U.S. PATENT DOCUMENTS

| 4,027,223 | 5/1977 | Renz | 361/246 |
| 4,176,248 | 11/1979 | Sheets | 375/17 |
| 4,785,465 | 11/1988 | Lang et al. | 375/7 |
| 4,807,249 | 2/1989 | Lang et al. | 375/7 |
| 4,943,979 | 7/1990 | Webber, Jr. | 375/7 |
| 5,119,398 | 6/1992 | Webber, Jr. | 375/7 |

FOREIGN PATENT DOCUMENTS

| 0235649 | 9/1987 | European Pat. Off. |
| 49-40405 | 4/1974 | Japan |
| 52-11806 | 1/1977 | Japan |
| 57-2218 | 1/1982 | Japan |

OTHER PUBLICATIONS

"Simplified Cable Connection of Loop Communication Circuit" IBM Technical Disclosure Bulletin vol. 25, No. 4 Sep. 1982 by B. W. Lee, et al.

*Primary Examiner*—Jeffrey A. Gaffin
*Assistant Examiner*—Richard T. Elms

[57]  ABSTRACT

A serial signal transmission device and a control method for determining polarity which can be used in various systems, for example, air conditioners, and a remote controller. The serial signal transmission device which carries out signal transmission between a plurality of control devices uses two transmission wires with fixed polarity, the serial transmission interface of each control device is equipped with two pairs of differential drivers and receivers, and the driver outputs and receiver inputs of different polarity in these two pairs of drivers and receivers are connected to each other. This device and control method make connection terminals for signal lines on each control device nonpolar, considerably reducing workload required for installing the apparatuses and wiring and eliminating connection errors.

7 Claims, 7 Drawing Sheets

SERIAL SIGNAL TRANSMISSION DEVICE AND CONTROL METHOD FOR DETERMINING POLARITY

TECHNICAL FIELD

The present invention relates to a device which uses the transmission of polar serial signals and which is capable of switching the polarity of the signals, and more specifically to a transmission device for serial signals which is used for signal transmission between control devices on air conditioners, and to a method for determining the polarity of such transmission devices.

BACKGROUND ART

Figure 5:
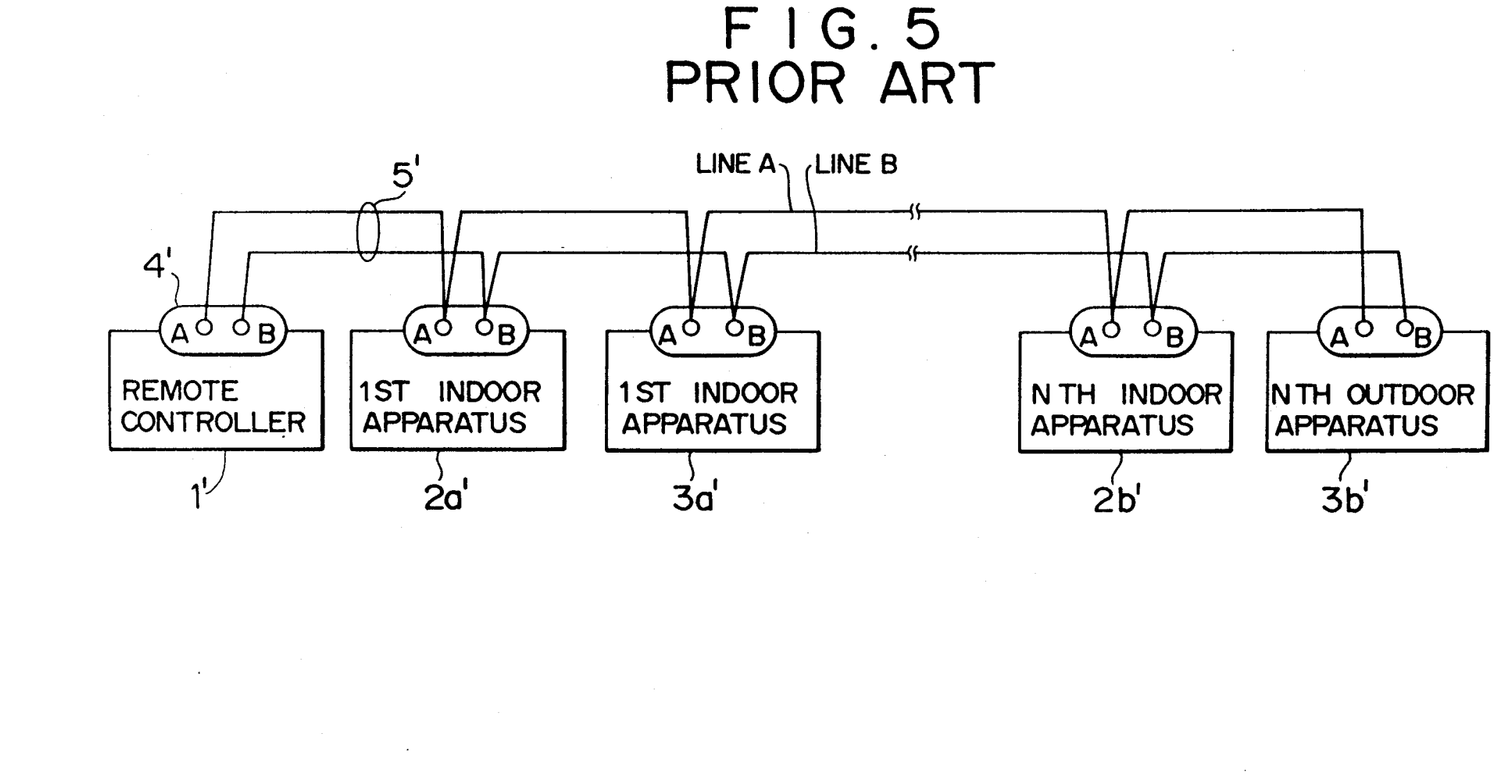
FIG. 5 shows a conventional and basic scheme of serial transmission for air conditioners.
Figure 6:
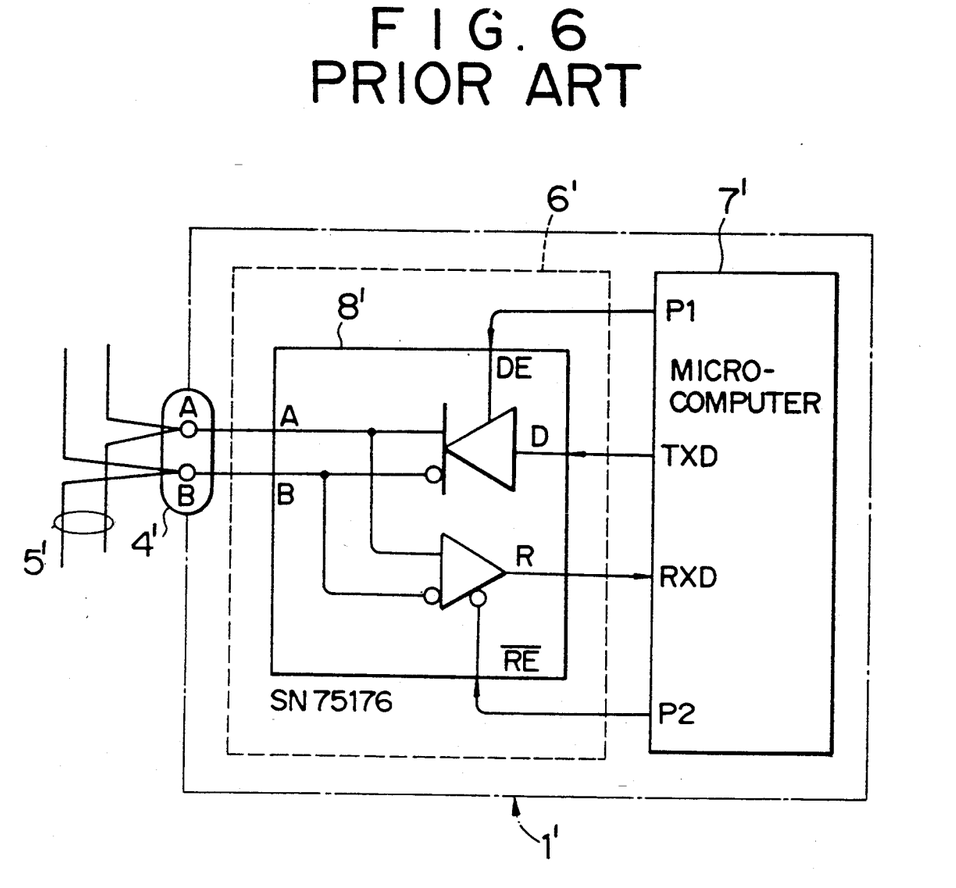
FIG. 6 shows a conventional circuit diagram of serial transmission interface for air conditioners.

An air conditioning system commonly comprises a remote controller, an indoor apparatus and an outdoor apparatus. It is known that signal transmission between these apparatuses can be done with a two-wire crossover wiring system utilizing serially encoded signal transmission technology so as to reduce the number of wires used. According to this method, it is currently possible for a single controller to control a plurality of indoor and outdoor apparatuses. FIG. 5 shows a basic scheme of a conventional two-wire crossover wiring system for serial signal transmission. Also, FIG. 6 shows a conventional differential transmission circuit as an example of a serial transmission interface. In FIGS. 5 and 6, a remote controller 1' is connected to indoor apparatuses 2a' and 2b' and outdoor apparatuses 3a' and 3b' through a crossover wiring 5' so that the control and monitoring of air conditioning systems can be centralized.

Each apparatus (the remote controller 1', the indoor apparatuses 2a' and 2b', and the outdoor apparatuses 3a' and 3b') has a serial transmission interface 6' and a microcomputer 7'. When the microcomputer 7' carries out transmission and reception of signals, it controls control signals DE and RE of a differential line driver/receiver IC 8'.

In the example of FIG. 5, the two wires of the crossover wiring 5' have polarity, and line A and line B have to be connected to terminal A and terminal B at the signal terminal 4', respectively. In a conventional system, it has been a problem that, when this connection is reversed, normal signal transmission operation becomes impossible, and the air conditioners cannot be operated properly.

DISCLOSURE OF INVENTION

An object of the present invention is to provide a serial signal transmission device and a control method for determining polarity so as to resolve the above-mentioned problem associated with conventional systems.

The serial signal transmission device of the present invention is characterized in that, in a serial signal transmission device which carries out signal transmission between a plurality of control devices using two transmission wires with fixed polarity, the serial transmission interface of each control device is equipped with two pairs of differential drivers and receivers, and the driver outputs and receiver inputs of different polarity in these two pairs of drivers and receivers are connected to each other.

According to the serial signal transmission device of the present invention, it becomes possible to transmit signals properly, for example, by including a function of switching the polarity of signal wires in a serial transmission interface of each control device and by choosing a driver and a receiver with correct polarity from two pairs of drivers and receivers having different polarity.

Also, the control method for determining polarity of the present invention is characterized in that, in a serial signal transmission device which uses two transmission lines with predetermined polarity to carry out signal transmission in both directions between a plurality of control devices, which each control device has two pairs of differential drivers and receivers in its serial transmission interface, and in which a driver output and a receiver input with different polarity of these two pairs of drivers and receivers are connected to each other, the polarity of each signal transmission device is adjusted by transmitting, a random number of times and between signal transmission devices, data packets containing data as to whether polarity has been determined and whether the polarity is in order or in reverse and data expressing the address number for identifying each signal transmission device while alternating their polarity, with their polarity in order or in reverse, so as to make each other's polarity in agreement, and a signal transmission device with undetermined polarity adjusts its polarity to make it coincide with that of another signal transmission device with determined polarity.

Furthermore, the control method of the present invention is characterized in that; in a serial signal transmission device using two transmission lines with predetermined polarity to carry out signal transmission in both directions between a plurality of control devices, which each control device has two pairs of differential drivers and receivers in its serial transmission interface, in which a driver output and a receiver input with different polarity of these two pairs of drivers and receivers are connected to each other; while transmitting, a random number of times and between each other and with each polarity, packets containing data as to whether polarity has been determined and whether the polarity is in order or in reverse while alternating their polarity so as to make each other's polarity in agreement, if a control device with its polarity undetermined receives a data packet indicating determined polarity from another control device it adjusts its own polarity to make it coincide with that of the control device with determined polarity, and if a control device with its polarity undetermined does not receive such a data packet it determines its own polarity according to a certain procedure; and if a control device with its polarity undetermined receives a data packet from another device indicating that its polarity is also undetermined, after a certain time delay which is determined according to the device's address number, the control device which received the data packet transmits another one of the above data packet expressing that its polarity is undetermined.

According to the control method for determining polarity of the present invention, by sending each other data packets containing data about whether polarity has been determined and about whether the polarity is in order or in reverse so as to adjust each other's polarity and adjust the polarity of a control device with undetermined polarity to the polarity of another device with determined polarity, making normal signal transmission possible.

BEST MODE FOR CARRYING OUT THE INVENTION

Figure 1:
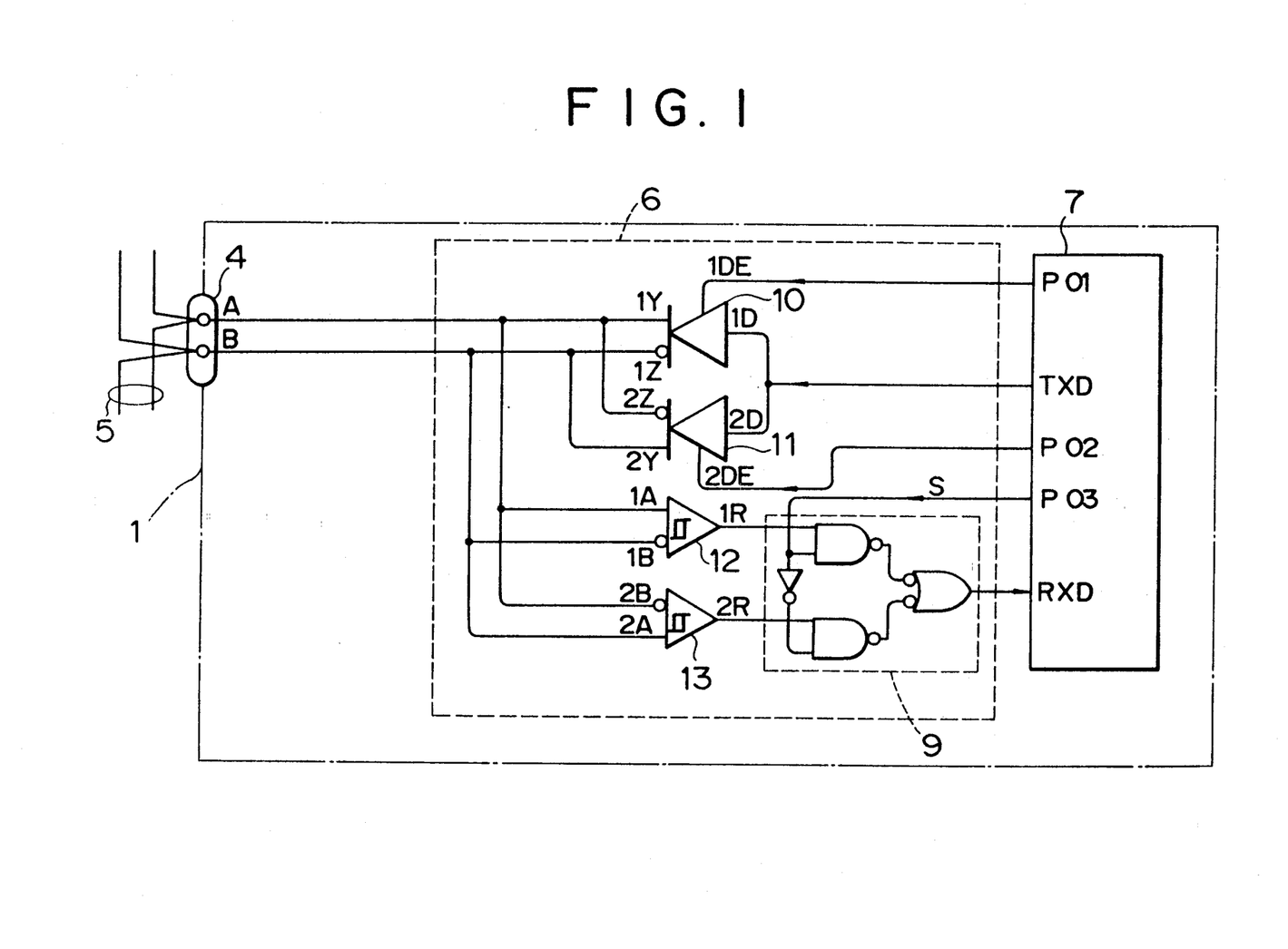
FIG. 1 shows a block diagram of a serial transmission interface circuit for an air conditioner, shown here as an embodiment of the present invention.
Figure 2:
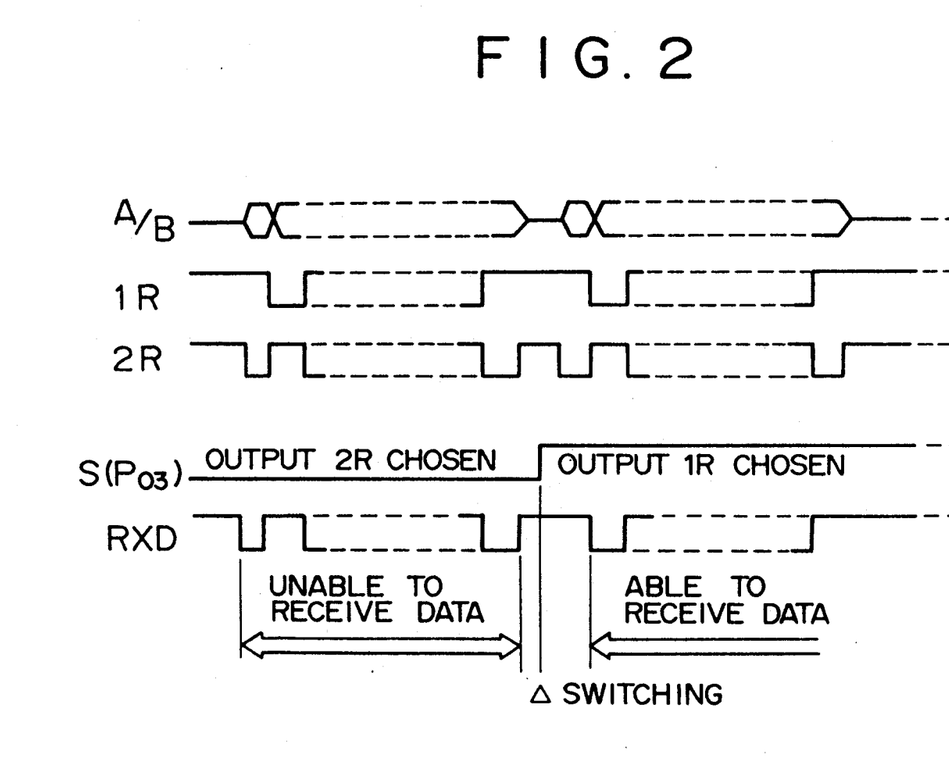
FIG. 2 shows an operational wave diagram of the embodiment shown in FIG. 1.

FIG. 1 shows a block diagram of an embodiment of the device of the present invention which can be used to carry out the method of the present invention. FIG. 2 shows an example of the operational waveform of this embodiment.

In FIG. 1, the numeral 1 indicates a remote controller, 2a and 2b indoor apparatuses, 3a and 3b outdoor apparatuses, 4 a connection terminal base for signal lines, 6 a serial transmission interface, 7 a microcomputer, 9 receiver output selection circuit, 10 and 11 differential line drivers, and 12 and 13 differential line receivers.

In FIG. 1, the serial transmission interface 6 comprises differential line driver/receiver ICs 10-13 and a receiver output selection circuit 9. The outputs of the drivers 10, 11 are connected to each other at the terminals with different polarity: 1Y is connected to 2Z, and 1Z to 2Y. The inputs of the receivers 12, 13 are also connected to each other at the terminals with different polarity: 1A is connected to 2B, and 1B to 2A.

When the microcomputer 7 sends and receives data, it chooses a driver and a receiver belonging to certain polarity (for example, the driver 10 and the receiver 12). As a means of choosing polarity (i.e., switching polarity), control signals 1DE, 2DE and S are used.

The signal lines 5 with unknown polarity are connected to the signal line connection terminal base 4 and to the differential line driver/receiver ICs 10-13. The driver inputs 1D, 2D are connected TXD of the microcomputer 7, and the receiver outputs 1R, 2R are connected to RXD of the microcomputer 7 via the receiver output selection circuit 9.

In FIG. 2, after power is turned on, a certain device transmits data packets according to predetermined procedures. The other devices determine whether or not the data packets have been received correctly. If not, the reception of data is determined to be impossible because the polarity is different between the two devices, as suggested by the situation in which the output 2R is chosen in FIG. 2. By switching the receiver outputs 1R, 2R using control signal S, the polarity of one of the two devices is reversed so as to choose the output 1R in FIG. 2. Then, normal reception of data becomes possible.

Here, in order to determine whether or not data has been received correctly, a detection code (a parity or a cyclic code is commonly used) is added. If data has been received correctly, it is determined that the particular device has chosen the proper polarity.

Through this series of operations, polarity is determined at all devices. At the time of transmitting data, the microcomputer 7 chooses and uses a driver belonging to correct polarity by using control signals 1DE (P01) and 2DE (P02).

Figures 3, 3B:
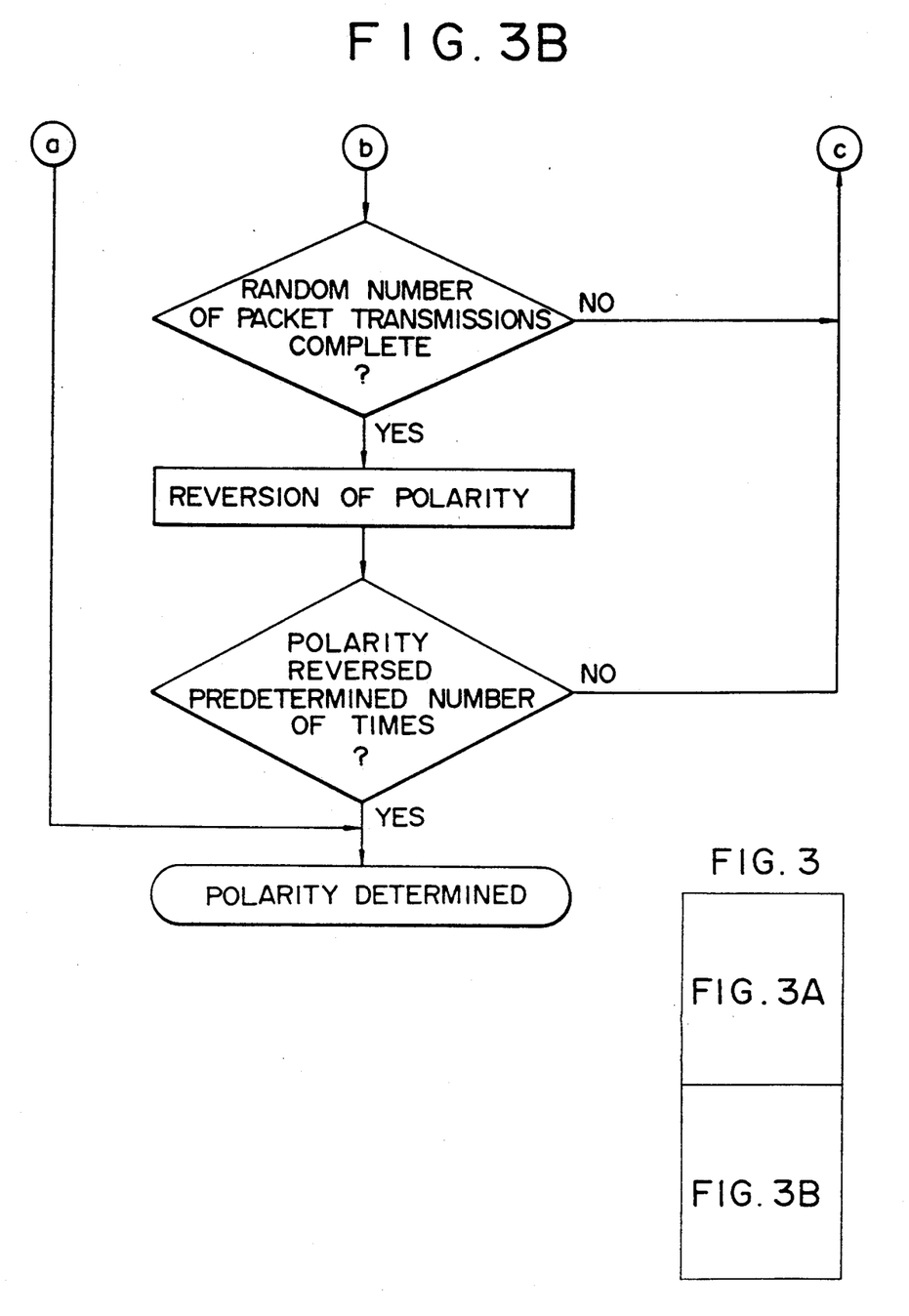
FIG. 3 shows a layout of FIGS. 3A and 3B.
FIGS. 3A and 3B show an operational flow chart of an embodiment of the control method for determining polarity of the present invention using the serial transmission interface shown in FIG. 1.
Figure 3A:
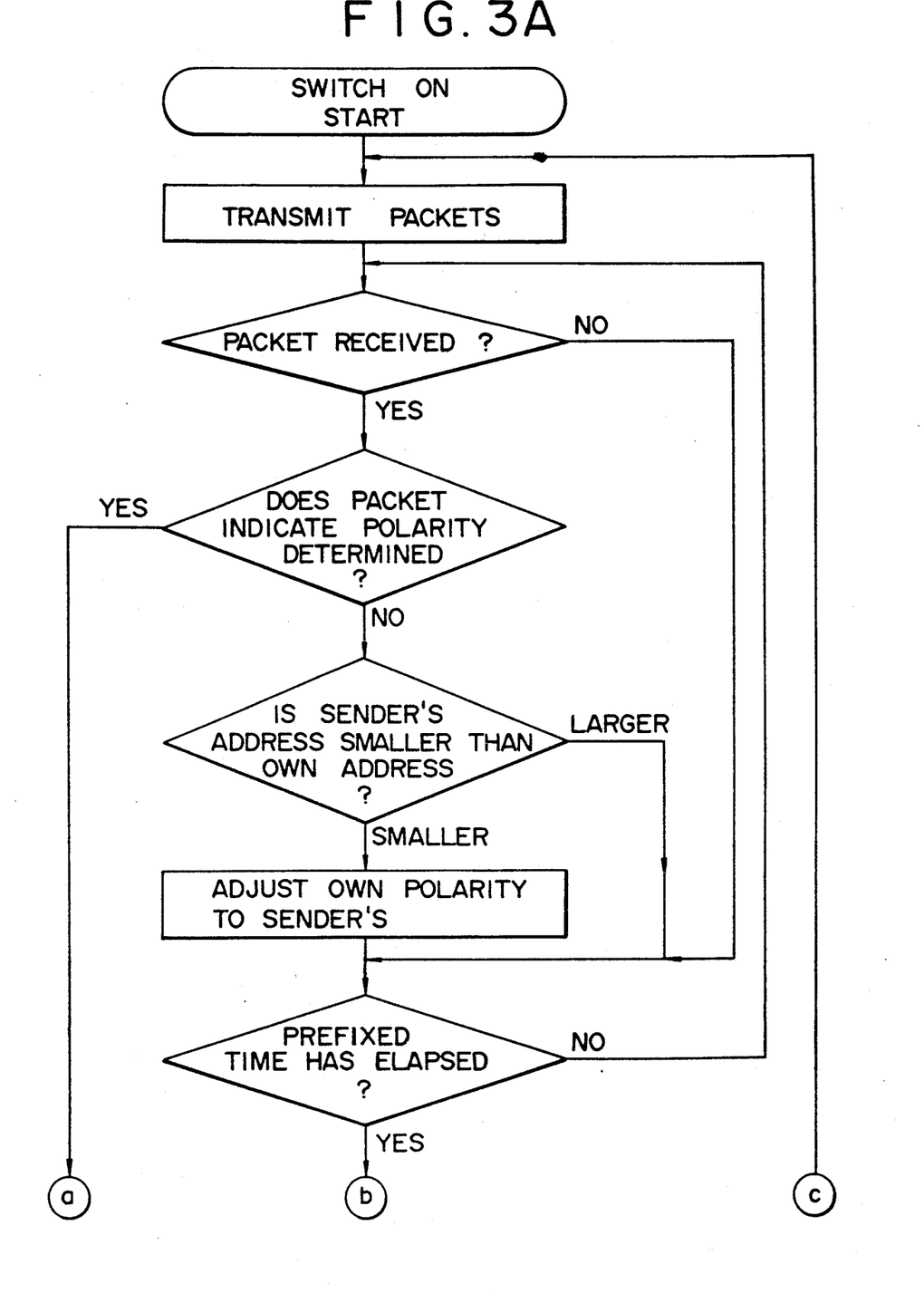

FIG. 3 shows a layout of FIGS. 3A and 3B.

FIGS. 3A and 3B are an operational flow chart showing how polarity is determined in an embodiment of the present invention.

In FIGS. 3A and 3B, after power is turned on, each device transmits data packets containing its address number, that is assigned according to a method not shown in the figure, and data about whether its polarity is in order or reverse and data indicating that the polarity is undetermined. Initially the polarity is preset to positive polarity.

After the packet transmission, if the data can be received properly, polarity is clearly determined to be the same between devices. If the data indicates it is from a device with its polarity determined after checking the content of the received packet, this process is terminated since polarity is clearly in agreement and determined. Also, if the data packet turns out to have come from a device with undetermined polarity, the address numbers of its own and of the sender device are compared. If the sender's address number is smaller than that of the receiver device, the polarity of the receiver device which has temporarily been set is switched to agree with the sender's polarity, and the receiver device now reverses polarity data in data packets thereafter before sending them out. When a given period of time has elapsed after the transmission of the data packet, this receiver device reverses its polarity. That is, it carries out the switching of P01, P02 and P03 in FIG. 1.

After reversing its polarity a given number of times, the polarity determination process is finally terminated.

The process of polarity determination described above can be summarized as follows:

(1) A device with undetermined polarity adjusts its own polarity so that its polarity coincides with that of another device with determined polarity.

(2) Between devices with undetermined polarity, polarity is adjusted to that of the one with a smaller address number.

(3) By judging polarity while switching polarity, even between devices with reverse polarity, as soon as one reverses its polarity, they become able to communicate with each other so that judgment on polarity becomes possible.

(4) If two devices with reverse polarity start the process of judging polarity simultaneously, they can find the situation in which the polarity of the two are in agreement by setting random values for intervals from one polarity reversion to another (or by transmitting data packets at equal intervals while making random the number of repeating packet transmissions without polarity reversion), so as to make it possible to communicate with each other and determine polarity.

Figure 4:
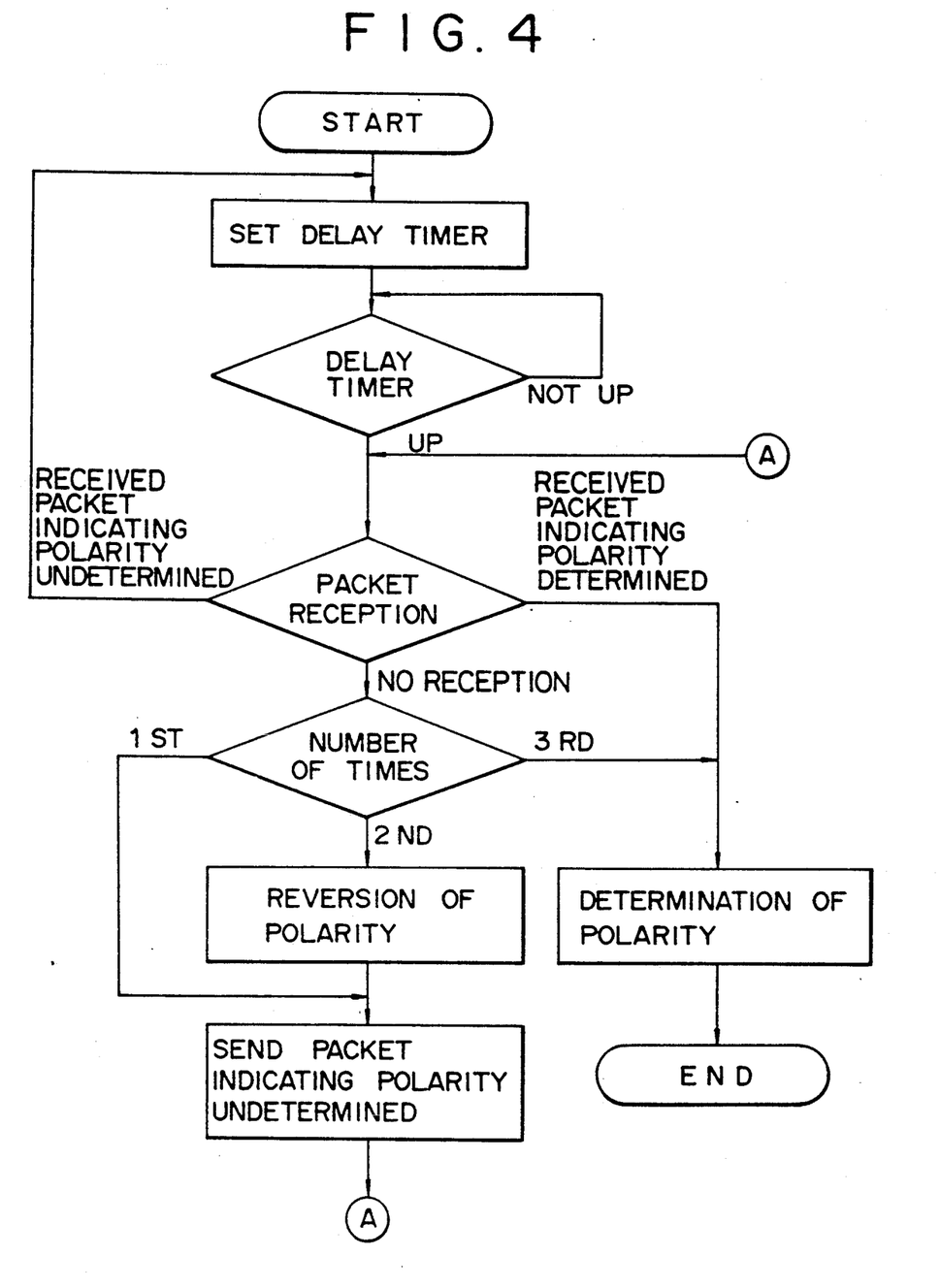
FIG. 4 shows an operational flow chart of another embodiment of the method of the present invention.

FIG. 4 is a flow chart showing the process for the determination of polarity in another embodiment of the present invention.

In FIG. 4, after power is turned on, each device is delayed for a period of time corresponding to its own address number and confirms reception of a data packet after this delay time. If the received packet indicates that polarity is undetermined, the device again enters the delay mode and does not send out data packets since other devices are in the process of determining polarity. If it receives a data packet indicating that polarity has been determined, its polarity instantly becomes determined. If it receives no data packet, it can send, before other devices, data packets indicating that its polarity is still to be determined: first, it transmits a data packet indicating that polarity is undetermined, and then it reverses its polarity and subsequently sends another data packet. Also, if it has completed these two transmissions, it carries out a process for polarity determination based on its own judgement.

The embodiment of the method of the present invention described above can be summarized as follows:

(1) Two pairs of drivers and receivers are provided and connected to each other so that each is in reverse polarity with the other. This makes it possible to transmit with either of reverse polarity or regular polarity.

(2) If a device with undetermined polarity receives a packet indicating determined polarity, it determines that polarity is in agreement between two devices and the polarity of the device with undetermined polarity is deemed determined.

(3) If a device with determined polarity receives a data packet indicating undetermined polarity, it transmits a data packet indicating determined polarity. As a result of this, the device which transmitted the packet indicating undetermined polarity and, subsequently, received the data packet indicating determined polarity determines its polarity to make it coincide with the polarity of the device with determined polarity so that these two devices have the same polarity.

(4) If a device with undetermined polarity does not receive any data packet indicating determined polarity even though it has reversed its polarity and transmitted, with either polarity, data packets indicating undetermined polarity, since it is clear that none of the other devices has determined polarity, it can determine its polarity with any polarity.

(5) If power is turned on simultaneously at a plurality of devices, those devices have undetermined polarity and also transmit data packets indicating that polarity is to be undetermined simultaneously. As a result, they receive unnecessary data packets indicating undetermined polarity between each other, or the increased number of packets occupying transmission lines can affect the transmission of data, or collisions of a number of data packets may destroy data. To prevent these problems from occurring, a delay timer is provided at each device so that, if a device with undetermined polarity receives a data packet indicating that polarity is to be undetermined, the delay timer is set for a period of time corresponding to each device's own address number and transmission is inhibited until the delay timer has expired.

As a result, among a plurality of devices with undetermined polarity, the one whose delay time expires first would determine its polarity, and the other devices then follow to set their polarity in agreement with the device which determines polarity first.

INDUSTRIAL APPLICABILITY

According to the device of the present invention, it becomes possible to make connection terminals for signal lines on each apparatus nonpolar and considerably reduce the workload required for installing the apparatuses and wiring. Also, there is no operational errors because of mistaken connections, making the reliability of an entire system improved.

Also, according to the method of the present invention, by transmitting data packets between each other, the polarity of a device with undetermined polarity is adjusted to coincide with that of a device with determined polarity. This makes it possible to make terminals for signal line connection nonpolar so as to greatly reduce efforts required when apparatuses and wiring and connection of signal lines are installed. Furthermore, each device can be operated without problems associated with connection errors, greatly improving the reliability of a total system in which they are utilized.

We claim:

1. A serial signal transmission device for transmitting signals between a plurality of control devices using two transmission wires with fixed polarity, comprising a serial transmission interface for each of said plurality of control devices, each of said serial transmission interfaces including a pair of differential drivers and a pair of receivers wherein driver outputs of different polarity of said pair of differential drivers are interconnected.

2. A control method for determining polarity in a serial signal transmission device having two transmission lines with predetermined polarities for transmitting signals in both directions between a plurality of control devices, wherein each of said plurality of control devices has a serial interface with two pairs of differential drivers and receivers and wherein a driver output and a receiver input with different polarities are interconnected, said method comprising the steps of:

(a) adjusting a polarity of each of said plurality of control devices by transmitting between each of said plurality of control devices data packets a random number of times, including data indicating whether polarity has been determined, data indicating whether polarity is in order or in reverse, and data indicating an address number for identifying each of said plurality of control devices while alternating their polarity, in order to select a polarity for two of said plurality of control devices to communicate via one of said transmission lines; and (b) adjusting a polarity one of said plurality of control devices with an undetermined polarity such that the polarity of the one of said plurality of control devices coincides with a polarity of one of said plurality of control devices adjusted in step (a).

3. A control method for determining polarity in a serial signal transmission device including two transmission lines with predetermined polarities for transmitting signals in in both directions between a plurality of control devices, wherein each of said plurality of control devices has a serial interface with two pairs of differential drivers and receivers, wherein a driver output and a receiver input with different polarities are interconnected comprising the steps of:

(a) transmitting data packets a random number of times and between each of said plurality of control devices, said data packets including data indicating whether polarity has been determined and data indicating whether polarity is in order or in reverse while alternating a polarity of each of said plurality of control devices such that said polarities coincide;

(b) adjusting a polarity of a control device with undetermined polarity if said undetermined control device receives a data packet indicating determined polarity from another of said plurality of control devices such that the polarity of said undetermined control device coincides with the polarity of another of said plurality of control devices with determined polarity, and if said undetermined control device does not receive said data packet, said undetermined control devices determines its polarity according to a certain procedure; and (c) transmitting another data packet indicating that the polarity of said undetermined control device is undetermined if a control device with its polarity undetermined receives a data packet from another undetermined control device after a certain time delay which is determined according to an address number of each of the two undetermined control devices.

4. A control method for determining polarity of a serial signal transmission device, including two transmission lines with predetermined polarities for transmitting signals bidirectionally between a plurality of control devices, each of said plurality of control devices including a serial interface, including a pair of differential drivers and a pair of receivers, wherein an output of one of the pair of differential drivers is connected to an input of one of the pair of receivers with opposite polarity, said method comprising the steps of:

(a) transmitting a random number of times, a first data packet from a first of said plurality of control devices to a second of said plurality of control devices, while alternating a polarity of said first control device, said first data packet including polarity determination data, polarity data, and first control device address data;

(b) adjusting a polarity of said second control device to correspond to a polarity of said first control device if the polarity of said second control device is undetermined and the polarity of said first control device is determined; and (c) adjusting the polarity of said second control device to correspond to the polarity of said first control device if the polarity of both said first and second control device is undetermined and a value of said first control device address data is less than a value of second control device address data.

5. The control method of claim 4, wherein said step (a) further includes transmitting the random number of times, a second data packet from said second control device to said first control device, while alternating the polarity of said second control device, wherein an interval for transmission by said first control device is different from an internal of transmission by said second control device.

6. A control method for determining polarity in a serial signal transmission device, including two transmission lines with predetermined polarities for transmitting signals bidirectionally between a plurality of control devices, each of said plurality of control devices including a serial interference, including a pair of differential drivers and a pair of receivers, wherein an output of one of the pair of differential drivers is connected to a input of one of the pair of receivers with opposite polarity, said method comprising the steps of:

(a) adjusting a polarity of one of said plurality of control devices with undetermined polarity to a polarity of another of said plurality of control devices with determined polarity; and (b) determining the polarity of the one of said plurality of control devices if a polarity of the remaining ones of said plurality of control devices are all undetermined, wherein the determination by the one of said plurality of control device is delayed by a time corresponding to an address number of the one of said plurality of control devices.

7. The method of claim 6, wherein the one of said plurality of control devices has a lowest address number of said plurality of control devices.

* * * * *